July 8, 1947.                    H. B. MILLER                    2,423,514
                                JOINTING MACHINE
                             Filed July 14, 1945                3 Sheets-Sheet 2
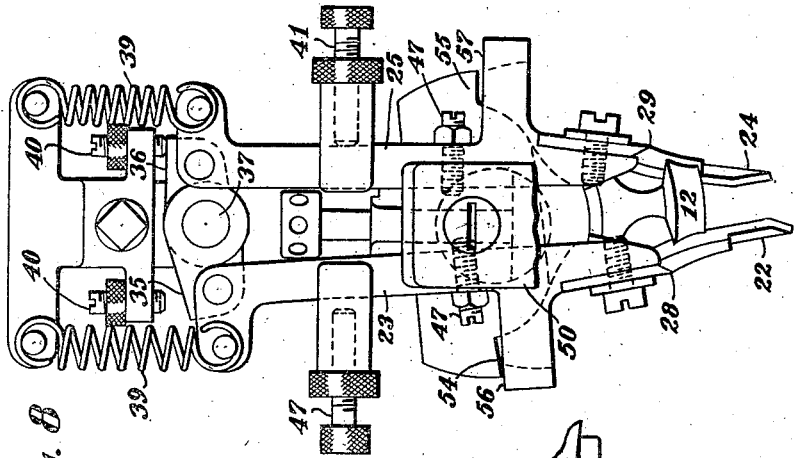
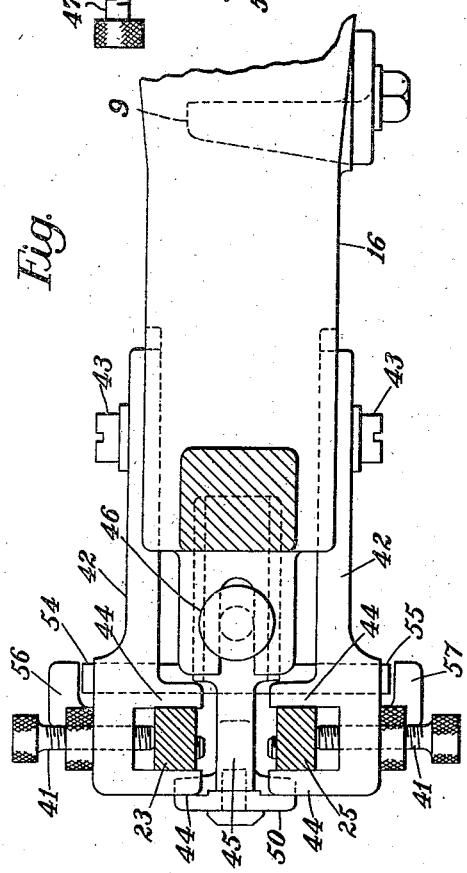
Inventor
Homer B. Miller
By his Attorney July 8, 1947.                H. B. MILLER                2,423,514
                            JOINTING MACHINE
                        Filed July 14, 1945          3 Sheets-Sheet 3
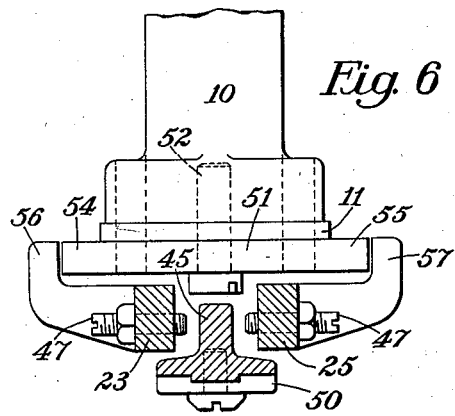
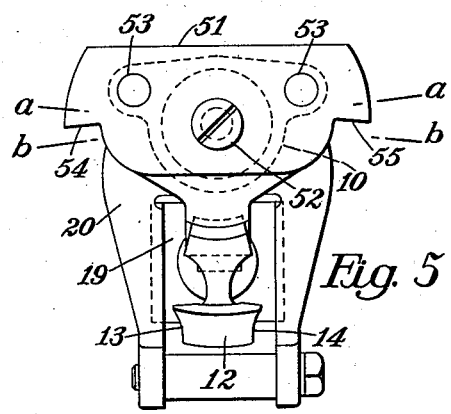
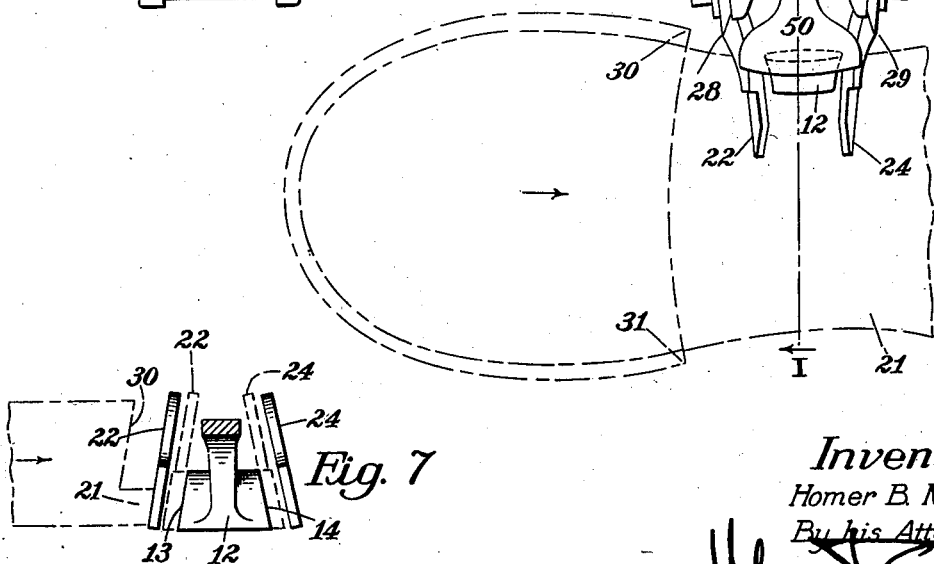
Inventor
Homer B. Miller
By his Attorney Patented July 8, 1947

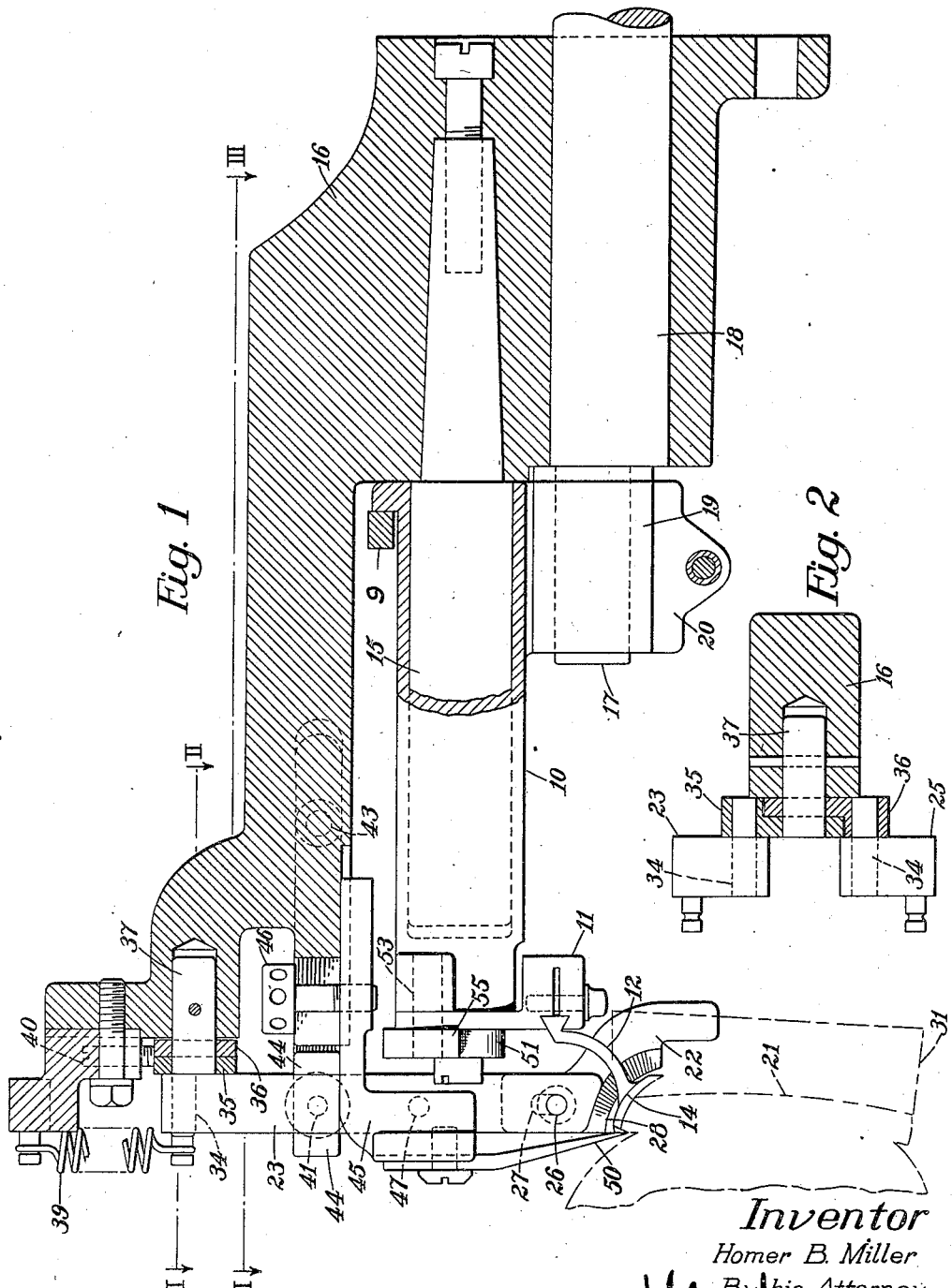

2,423,514

UNITED STATES PATENT OFFICE 2,423,514

JOINTING MACHINE

Homer B. Miller, Gardiner, Maine, assignor to United Shoe Machinery Corporation, Flemington, N. J., a corporation of New Jersey Application July 14, 1945, Serial No. 605,096

8 Claims. (Cl. 12—85)

The purpose of the present invention is to provide improvements in machines used in that shoemaking operation known as jointing. This is an edge-trimming operation that undercuts an edge of the shank of the outsole of a shoe from a point about ¾ inch in front of the breast of the heel to the breast line, and it completes the trimming begun in an earlier operation by a rotary toothed cutter which cannot cut to the breast line and is therefore used only to trim as far as it may without attacking the breast of the heel.

Commercial jointing machines are provided with an oscillatory trimming knife and two chopping knives, one of the latter being arranged to cut off the shaving or chip trimmed from the right side of a sole, and the other being arranged to cut off the chip trimmed from the left side. The trimming knife has two cutting edges, one at each end. One of them is used to cut toward the right on the right side of a sole, and the other to cut toward the left on the left side of a sole. This knife has a short stroke (about ¼ inch) and it is vibrated at high speed. It may execute many cutting strokes in the course of one trimming operation, but no chopping cut is needed until the trimming operation has progressed to the breast line, where one or more strokes of the corresponding chopping knife may be needed to cut off the chip.

The features constituting the present invention provide for improved control and operation of the chopping knives of a jointing machine in which the trimming operation is performed, as heretofore, by one cutting edge of an oscillatory trimming knife. Both chopping knives are normally inactive while the trimming knife is in oscillation, but when the breast of a heel has been advanced to a point where a shaving is about to be cut off, it engages one face of the corresponding chopping knife and thereby shifts the latter sidewise into its path of chopping movement. Springs normally retract the chopping knives from their paths of chopping movement, but when either chopping knife is shifted to its path of chopping movement it receives one or more chopping strokes from the oscillatory unit that includes the trimming knife. For the latter purpose the trimming unit is provided with right and left strikers by which its retrograde motions may be utilized to operate one or the other chopping unit, according to which of them is shifted to its path of chopping movement.

The elements above mentioned are organized to provide a series of positive chopping strokes in alternation with the trimming strokes, but only while a chopping unit is maintained in cooperative relation to the corresponding striker.

Referring to the drawings,

Fig. 1 is a longitudinal section in a vertical plane (see line I—I in Fig. 4) of the head of a jointing machine embodying this invention;

Fig. 2 is a horizontal section through the elements intersected by line II—II in Fig. 1;

Fig. 3 is a horizontal section indicated by line III—III in Fig. 1;

Fig. 4 is an end elevation as viewed from the left of Fig. 1;

Fig. 5 is an end elevation of the oscillatory trimming unit alone;

Fig. 6 is a horizontal section indicated by line VI—VI in Fig. 4;

Fig. 7 is a top plan view including the trimming knife, both chopping knives and portions of a shoe (dotted lines) in the region where joining is commonly required; and Fig. 8 is an end elevation similar to Fig. 4 but representing the left-hand chopping blade as depressed to the lower limit of its chopping path where its cutting edge would complete the severance of a shaving made by the trimming knife.

The oscillatory trimming unit (Figs. 1 and 5) comprises a sleeve 10, a knife-holder 11 and a trimming knife 12, all rigidly related. The knife 12 is provided with two cutting edges 13 and 14, one at each end of its blade portion, and they are curved to produce outcurved and undercut profiles on the edges of soles. The sole of a shoe is indicated at 21. The sleeve 10 has a bearing on a spindle 15 about which it may oscillate. The spindle is affixed to a frame 16, and the sleeve is retained thereon by a finger 9.

Motion for oscillating the sleeve 10 is derived from an eccentric 17 carried by a power-driven shaft 18 journaled in the frame. A wear block 19 carried by the eccentric is straddled and engaged by the cheeks of a yoke 20 formed on the sleeve. The details of construction above described are all in accordance with jointing machines heretofore in commercial use and described in United States Letters Patent No. 1,534,076, granted April 21, 1925, on an application filed in the name of Frederick H. Perry.

Two mated chopping units are located respectively at opposite sides of the axis of the trimming unit (Figs. 4, 6 and 7), the one at the left comprising a flat cutting blade 22 and a carrier 23, and the one at the right comprising a flat cutting blade 24 and a carrier 25. These blades are affixed to their carriers by screws 26 and are provided with slots 27 (Fig. 1) for vertical adjustment and with curved cutting edges 28 and 29 of the same curvature as that of the cutting edges 13 and 14. The cutting edges 28 and 29 lie in the planes of the outer major faces of the blades. Consequently, when a heel is fed toward the right the edge 30 of its breast will engage the left face of the blade 22 in which the cutting edge of that blade lies. Likewise, the edge 31 of the heel breast and the cutting edge of the blade 24 will be registered if the shoe be reversed end for end and fed to the left against the right face of that blade. These conditions insure the desired locations of chopping cuts when the chopping units are operated as hereinafter described.

The chopping units are hung as pendulums on pivot pins 34 the axes of which are parallel with the axis of oscillation of the trimming unit. The pins 34 are affixed to individually movable radius arms 35 and 36 both mounted on a central pivot pin 37 affixed to the frame 16. Tension springs 39 normally lift the chopping units, and the arms 35 and 36 are thereby normally held against stop-screws 40 affixed to the frame. The upper ends of the springs 39 are anchored to the frame, and the lower ends thereof are connected to the carriers 23 and 25 respectively at points offset sidewise from the pivot pins 34 (Fig. 4) where the force of the springs will normally swing the chopping blades 22 and 24 away from each other. The carriers 23 and 25 are thereby normally held against stop-screws 41 which arrest their movements of separation.

The stop-screws 41 are screwed through tapped holes in bars 42 affixed to the frame 16 (Fig. 3) by screws 43 and embedded in mortise grooves. Each bar 42 is provided with two parallel confronting cheeks 44, the carrier 23 being straddled and engaged by the cheeks of one bar, and the carrier 25 being likewise related to the other bar. The carriers are thus guided up and down as well as sidewise by the cheeks.

When a shoe in process of being jointed is fed from left to right (Figs. 4 and 7) it may advance a short distance after the edge 30 of the heel strikes the chopping blade 22, but the latter will be shifted toward the right by the heel until the carrier 23 is arrested by a stop 45 (Fig. 6) affixed to the frame by a screw 46. The stop projects between the carriers 23 and 25 and each of the latter is provided with a screw 47 arranged to cooperate with a face of the stop, first to arrest its sidewise movement and thereafter to guide its chopping movement. The stop member 45 is utilized also to support a guard or guide 50 the lower portion of which lies in contiguous relation to the front of the trimming cutter and is intended to run in the crease between the upper and the welt of a shoe.

Vertical motion for operating the chopping units is derived from the oscillatory trimming unit. For this purpose a plate 51 is affixed to the sleeve 10 by a screw 52 and dowels 53. These parts also fasten the knife-holder 11 to the sleeve. The plate 51 is shaped to provide a striker 54 for depressing the knife-carrier 23 (Fig. 8), and a striker 55 for depressing the knife-carrier 25. These strikers are diametrically opposite each other with reference to their axis of oscillation, and their angles of oscillation are indicated by broken lines a, b and a, b (Fig. 5).

The carrier 23 is provided with a lug 56 arranged to be shifted sidewise into and out of the path of the striker 54, and in like manner the carrier 25 is provided with a lug 57 arranged to be shifted sidewise into and out of the path of the striker 54. The adjustable stops 40 (top of Fig. 4) are related to the strikers 54 and 55 as follows: each stop should be set to arrest upward movement of the corresponding chopping unit at a point that will locate the upper face of the lug 56 or 57 as high as possible within the range of the corresponding striker but not so high as to prevent the lug from moving under the striker when the latter is at the top of its stroke and oscillating at regular speed. If a striker is below the level of the upper edge of the lug when the breast of a heel starts the sidewise shifting of a chopping unit it will interrupt the shifting only until it rises to its upper limit of oscillation, whereupon it will clear the lug and permit a second step of shifting movement limited only by co-action of the screw 47 and the stop 45. The next downward stroke of the striker will depress the chopping unit and the latter will repeat its chopping until the heel is disengaged from the chopping knife. When this occurs the spring 39 will retract the chopping unit sidewise and thereby remove the lug from the path of the striker.

In Fig. 7 the chopping knives 22 and 24 are represented in their initial positions with solid lines, and in their chopping positions with dotted lines, the latter positions being determined by setting the screws 47 according to the outer limits of travel of the trimming edges 13 and 14. The stop-screws 41 should be set out far enough to enable the lugs 56 and 57 to clear the strikers when the chopping units are retracted sidewise.

It is to be observed that chopping movement of the left-hand chopping unit (Fig. 8) can occur only while the trimming knife 12 is receding to the right, and that chopping movement of the right-hand chopping unit can occur only while the trimming knife is receding to the left. This alternation of chopping strokes and trimming strokes insures clearance of the knives one by another, and at the same time provides for a slight margin of over-travel of related cutting edges beyond the junction point where their cuts should intersect each other.

Having described my invention, what I claim as new and desire to secure by Letters Patent of the United States is:

1. In a jointing machine of the type in which a trimming unit having a cutting edge is oscillated continuously by power-driven means to trim an edge of the sole of a shoe, the combination comprising a normally inactive chopping unit having a cutting edge for chopping surplus material trimmed by said edge of the trimming unit, a striker carried by said trimming unit for operating said chopping unit, a spring by which said chopping unit is normally retracted from the path of said striker, said chopping unit extending into the path of the heel of the shoe and being movable sidewise by the heel into the path of said striker, and means by which said chopping unit is guided to and from its path of chopping movement and along said path.

2. In a jointing machine, a stationary member arranged to guide a shoe lengthwise by engagement with the welt-crease thereof, an initially inactive chopping unit including a cutting blade located in the path of a heel, said chopping unit being movable sidewise by the breast of the heel to a path of chopping movement, a stop arranged to arrest sidewise movement of said unit to said path, means by which said unit is guided, a spring by which said unit is normally retracted from said stop, a striker arranged to operate said unit in its path of chopping movement but to clear it when the unit is retracted sidewise, and power-driven means for continuously vibrating said striker.

3. In a jointing machine, a chopping unit including a blade one major face of which is arranged in the path of the heel of a shoe in process of being jointed, said blade having a cutting edge in the plane of said face, an oscillatory unit including a striker arranged to impinge against said chopping unit and thereby impart chopping strokes thereto, a spring arranged to retract said chopping unit from the work, means arranged to guide said chopping unit sidewise to and from the path of said striker, said oscillatory unit including a trimming knife arranged to shave an edge of the sole to a line of juncture with the cut made by said chopping blade, and power-driven means for continuously vibrating said oscillatory unit.

4. In a jointing machine, a normally inactive chopping unit including a cutting blade arranged to chop the edge of the sole of a shoe, a stationary member arranged to guide the sole to said blade by engaging the shoe in its welt crease, a striker arranged to operate said unit in a path of chopping movement, power-driven means for continuously vibrating said striker, resilient means by which said unit is normally retracted along its path of chopping movement and retracted sidewise from the path of said striker, a stop arranged to arrest retractory movement of said unit along its path of chopping movement, and stops arranged to arrest sidewise movements of said unit to and from the path of said striker, a portion of said blade being located initially in the path of a heel to be shifted sidewise thereby to its path of chopping movement.

5. In a jointing machine, a striker arranged to oscillate about a fixed horizontal axis, power-driven means for continuously rocking said striker about said axis, a fulcrum pin offset from said axis but parallel therewith, a normally inactive chopping unit suspended from said pin and having a cutting edge arranged to chop an edge of the sole of a shoe, and resilient means by which said unit is normally retracted sidewise from the path of said striker, a portion of said unit being located initially in the path of a heel projecting from the sole and said unit being movable sidewise by the heel into the path of said striker with angular movement about said pin.

6. In a jointing machine, an oscillatory trimming unit having a cutting edge for trimming an edge of the sole of a shoe, a normally inactive chopping unit extending into the path of a heel approaching said cutting edge, said chopping unit having a cutting edge for chopping surplus material trimmed by said edge of the trimming unit, a striker for operating said chopping unit, power-driven means by which said trimming unit and said striker are vibrated continuously, said chopping unit being movable sidewise by a heel into the path of said striker, and a spring by which said chopping unit is normally retracted from the path of said striker.

7. In a jointing machine of the type in which an oscillatory trimming unit is operated continuously by power-driven means and is provided with right and left cutting edges for trimming right and left edges of soles of shoes, the combination comprising right and left chopping units both normally inactive and each operable individually and including a cutting blade extending into the path of a heel approaching the corresponding cutting edge of the trimming unit, right and left strikers carried by said trimming unit for operating said chopping units, respectively, each of said chopping units being movable sidewise by a heel into the path of the corresponding striker, and resilient means by which said chopping units are normally retracted from the paths of said strikers.

8. A jointing machine comprising a member constrained to oscillate about a fixed horizontal axis, power-driven means by which said member is continuously vibrated, a cutter carried by said member and having a cutting edge movable from side to side to trim an edge of the sole of a shoe, a striker also carried by said member and arranged to move up and down, a chopping unit movable sidewise to and from the path of said striker and movable downwardly by the striker, said unit having a cutting edge arranged to chop the surplus material trimmed by said trimming cutter, a spring arranged to retract said chopping unit from the sole, and a spring arranged to retract said unit sidewise from the path of said striker.

HOMER B. MILLER.

REFERENCES CITED

The following references are of record in the file of this patent:

UNITED STATES PATENTS

| Number | Name | Date |
| --- | --- | --- |
| 1,442,175 | Perry | Jan. 16, 1923 |
| 1,108,225 | Perry | Aug. 25, 1914 |